United States Patent [19]
Braun et al.

[11] Patent Number: 5,894,715
[45] Date of Patent: Apr. 20, 1999

[54] MOUNTING APPARATUS FOR CONNECTING A POWER HEAD TO A DEVICE

[75] Inventors: Michael Braun, Wauwatosa; Patrick Bruener, Hartland; Gary S. Johnson, Hales Corners, all of Wis.

[73] Assignee: Briggs & Stratton Corporation, Wauwatosa, Wis.

[21] Appl. No.: 08/749,988

[22] Filed: Nov. 15, 1996

Related U.S. Application Data

[63] Continuation-in-part of application No. 08/388,588, Feb. 14, 1995, abandoned, which is a continuation-in-part of application No. 08/125,486, Sep. 22, 1993, abandoned.

[51] Int. Cl.⁶ .................................................. A01D 34/78
[52] U.S. Cl. .................................... 56/11.9; 56/320.1
[58] Field of Search .................................... 56/12.1, 11.9, 56/16.7, 17.5, 320.1

[56] References Cited

U.S. PATENT DOCUMENTS

| | | | |
|---|---|---|---|
| 3,973,378 | 8/1976 | Bartasevich et al. | 56/11.9 |
| 4,064,680 | 12/1977 | Fleigle | 56/11.9 |
| 4,882,896 | 11/1989 | Wilcox | 56/10.5 |
| 4,942,723 | 7/1990 | Wassell | 56/10.6 |
| 5,085,043 | 2/1992 | Hess et al. | 56/10.5 |
| 5,402,626 | 4/1995 | Zinck | 56/11.9 |
| 5,615,540 | 4/1997 | Yang | 56/11.9 |

FOREIGN PATENT DOCUMENTS

| | | | |
|---|---|---|---|
| 3 440 510 | 7/1986 | Germany | 56/16.7 |
| 1 165 286 | 7/1985 | U.S.S.R. | 56/16.7 |

OTHER PUBLICATIONS

AL–KO Accu Tec 32, Advertising flyer, published by AL–KO Britain Ltd., Aug., 1993.

"CCM650 18" Cordless Mulching Mower, published by Black & Decker Canada Inc., Dec., 1993.

"Owner's Operating Manual Cordless Mulching Mower Model BMM2400" published by Ryobi Outdoor Products, Inc. of Chandler, Arizona, Jan., 1993.

"Electric mower that really works", *Popular Science* magazine, Mar., 1974, p. 28 etc.

"Wolf–Gerate, instruction Manual, Senator accu 35", published Nov., 1991.

Photograph, Wolf–Gerate Cub Eletric Lawnmower, first sold at lest as early as 1994.

Photograph, Tecumseh Products power for a cordless electric lawnmower, publicly shown Jul. 1995.

Photograph, Wolf–Gerate cordless electric lawnmower, Jul., 1995.

SAE Standard J609a, Figure 3, p. 24.21 revised Jul., 1965.

*Primary Examiner*—Terry Lee Melius
*Attorney, Agent, or Firm*—Michael Best & Friedrich LLP

[57] ABSTRACT

The power head assembly for a cordless electric lawnmower has a removable upper housing that includes two spaced batteries, and a lower housing that is mounted to the deck of the grass cutting device. The upper housing has a handle, and at least one quick disconnect terminal that engages a mating quick disconnect terminal affixed to the lower housing. The lower housing includes an electric motor that is disposed between the two batteries when the upper housing is in place. A portion of the electric motor is located below the deck to further reduce the overall height of the device. The lower housing is mounted to the deck by several bolts which are placed in the same mounting pattern used to mount gasoline engines to a deck, so that the same decks may be used for both the cordless electric and gasoline-powered lawnmowers.

9 Claims, 8 Drawing Sheets

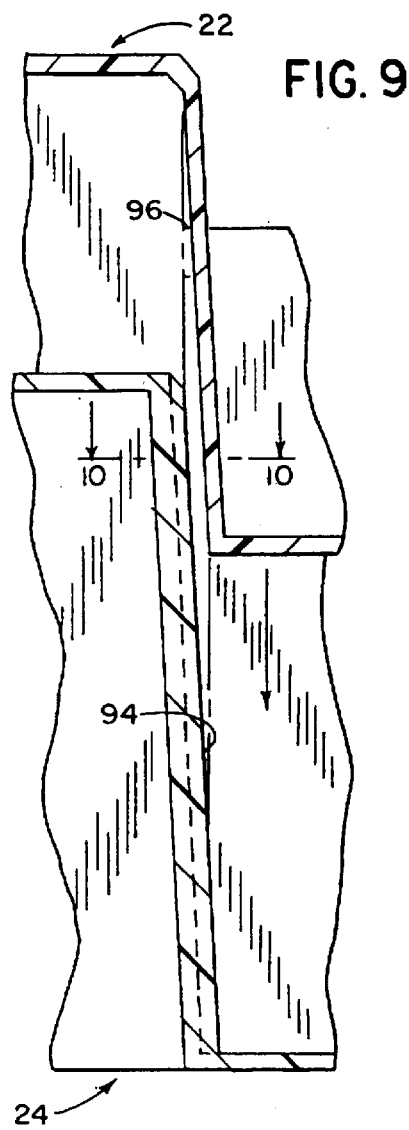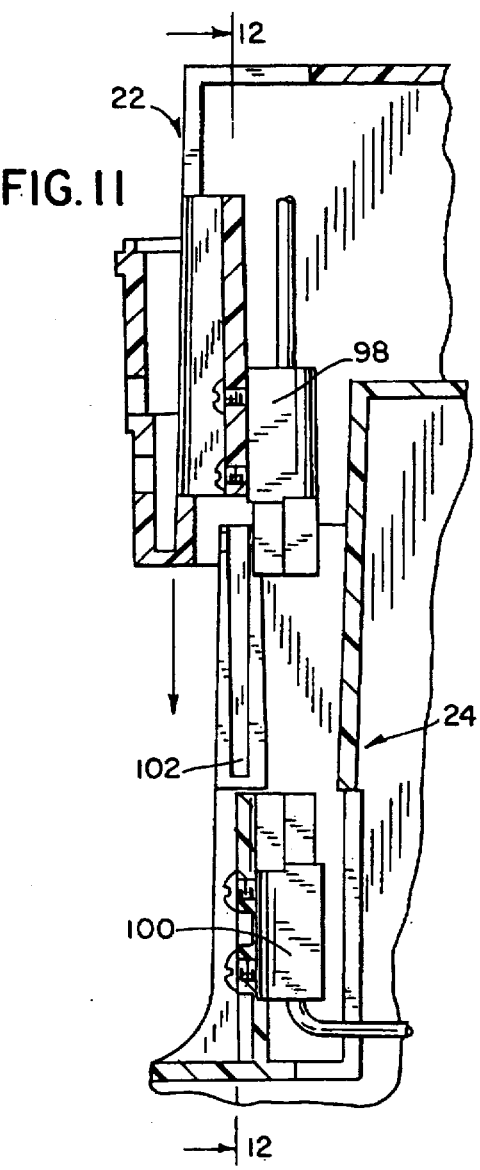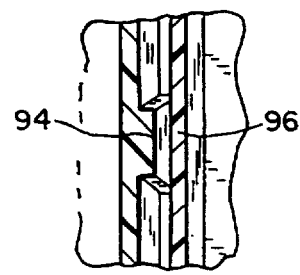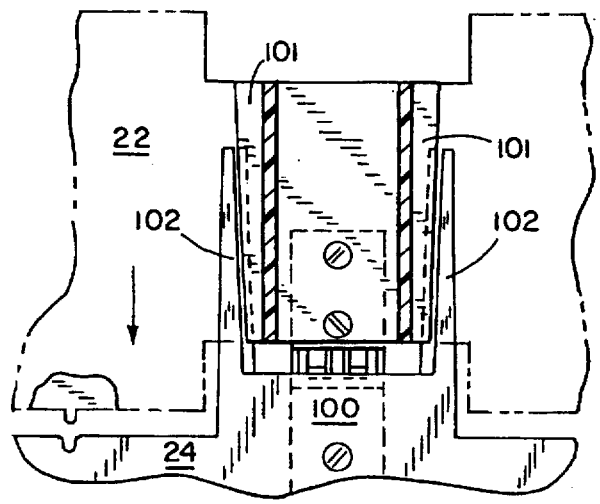
FIG. 9
FIG. 11
FIG. 10
FIG. 12

MOUNTING APPARATUS FOR CONNECTING A POWER HEAD TO A DEVICE

This application is a continuation-in-part of U.S. patent application Ser. No. 08/388,588 filed Feb. 14, 1995, which is a continuation-in-part of U.S. patent application Ser. No. 08/125,486 filed Sep. 22, 1993, both now abandoned.

BACKGROUND OF THE INVENTION

This invention relates to cordless electric grass cutting devices such as battery-powered lawnmowers, shears and the like. More particularly, this invention relates to such electric grass cutting devices having removable batteries.

To substantially eliminate the exhaust emissions from gasoline-powered lawnmowers and the like, and for the sake of convenience, battery-powered grass cutting devices have been developed. More recently, battery-powered grass cutting devices have been developed which have removable and interchangeable batteries.

One advantage of using interchangeable batteries is that when the battery or batteries discharge, they may simply be replaced by one or more fully charged batteries. As a result, the cutting time is extended. Another advantage of this approach is that the operational weight of the grass cutting device may be reduced since smaller batteries may be used in place of the large, bulkier batteries which are typically necessary to achieve significant cutting time if the batteries are not interchangeable.

Yet another advantage of using removable batteries is that if the battery is not built into the fixed mower housing, the battery may be recharged without moving the entire mower to a source of line current. This is an important advantage when the mower is stored in a shed that does not have electrical power.

To increase the output of a battery-powered grass cutting device, it is desirable to provide one or more batteries having a total output of 24 volts instead of a single 12 volt battery. The use of one or more batteries presents a problem with proper weight distribution. If a single 24 volt battery, or two 12 volt batteries, are placed in front of the electric motor, the weight of the device is not properly balanced. Also, if the batteries are placed behind the motor, they tend to interfere with the raised scroll used for rear bagging operations. If one 12 volt battery is placed on top of another 12 volt battery, then the height of the cutting device may be significantly increased, and the device is not aesthetically pleasing.

SUMMARY OF THE INVENTION

A power head assembly for a cordless electric grass cutting device is disclosed that is well balanced, has a low profile, and still is usable with decks of standard gasoline-powered grass cutting devices.

The power head assembly according to the present invention includes a lower housing, an upper housing, an electric motor that is substantially enclosed by the lower housing, and a means for mounting the lower housing to the deck of a standard gasoline-powered lawnmower or to the deck of an electric grass cutting device. The mounting means includes at least three spaced apertures that are disposed according to a standard bolt pattern used to mount gasoline-powered lawnmower engines to the deck.

The lower housing includes a cavity that receives a control circuit, and first and second supports that support receptacles for first and second batteries respectively. In a preferred embodiment, the electric motor is positioned so that at least a portion of the motor is disposed below the deck of the grass cutting device to reduce the overall height of the device.

The upper housing includes a first battery receptacle that receives a first battery, and is disposed on a first side of the electric motor. The upper housing also includes a second battery receptacle that receives a second battery, and that is disposed on the opposite side of the motor from the first battery receptacle and the first battery. The upper housing also includes a handle that is used to raise and lower the upper housing.

The power head assembly includes means for electrically connecting the first and second batteries to the motor without the use of any tools, and also means for electrically disconnecting the first and second batteries from the motor without the use of a tool. This connecting and disconnecting means preferably includes at least one quick disconnect terminal that is interconnected with the upper housing, and at least one second quick disconnect terminal interconnected with the lower housing. When the batteries become discharged, the operator simply lifts and removes the upper housing, and replaces it with another upper housing having charged batteries. The discharged batteries may be recharged using a charger, which is connected to the upper housing through a charger connector. A removable key is disposed in the upper housing, and blocks the charger connector while the cutting device is in use to prevent the cutting device from being connected to the charger while the cutting device is in use. The key may pass through an aperture in a battery housing.

The present invention may also include means for tilting the motor, the motor shaft, and the cutting blade so that grass is cut only when it passes under the forward end of the grass cutting device. The tilting means includes means for making the motor shaft centerline non-perpendicular to the mounting surface of the grass cutting device. The tilting means preferably includes a metal plate having at least one raised portion, such as a standoff, that raises one side of the motor.

It is a feature and advantage of the present invention to provide a grass cutting device for extended use that does not output significant exhaust emissions.

It is another feature and advantage of the present invention to provide a low profile power head assembly for an electric grass cutting device.

It is another feature and advantage of the present invention to provide a balanced power head assembly having interchangeable batteries.

It is yet another feature and advantage of the present invention to provide a power head assembly for a battery powered grass cutting device that may be mounted onto a standard deck of a gasoline-powered lawnmower.

These and other features and advantages of the present invention will be apparent to those skilled in the art from the following detailed description of the preferred embodiment and the drawings, in which:

BRIEF DESCRIPTION OF THE DRAWINGS

FIG. 9 is a side cross sectional view depicting a rib on the lower housing engaging a surface on a battery receptacle.

FIG. 10 is a top view of the rib, taken along line 10—10 of FIG. 9.

FIG. 11 is a side view depicting the two quick disconnect terminals before they are connected to each other.

FIG. 12 is an end view of the quick disconnect terminals, taken along line 12—12 of FIG. 11.

DETAILED DESCRIPTION OF THE PREFERRED EMBODIMENT

Figure 1:
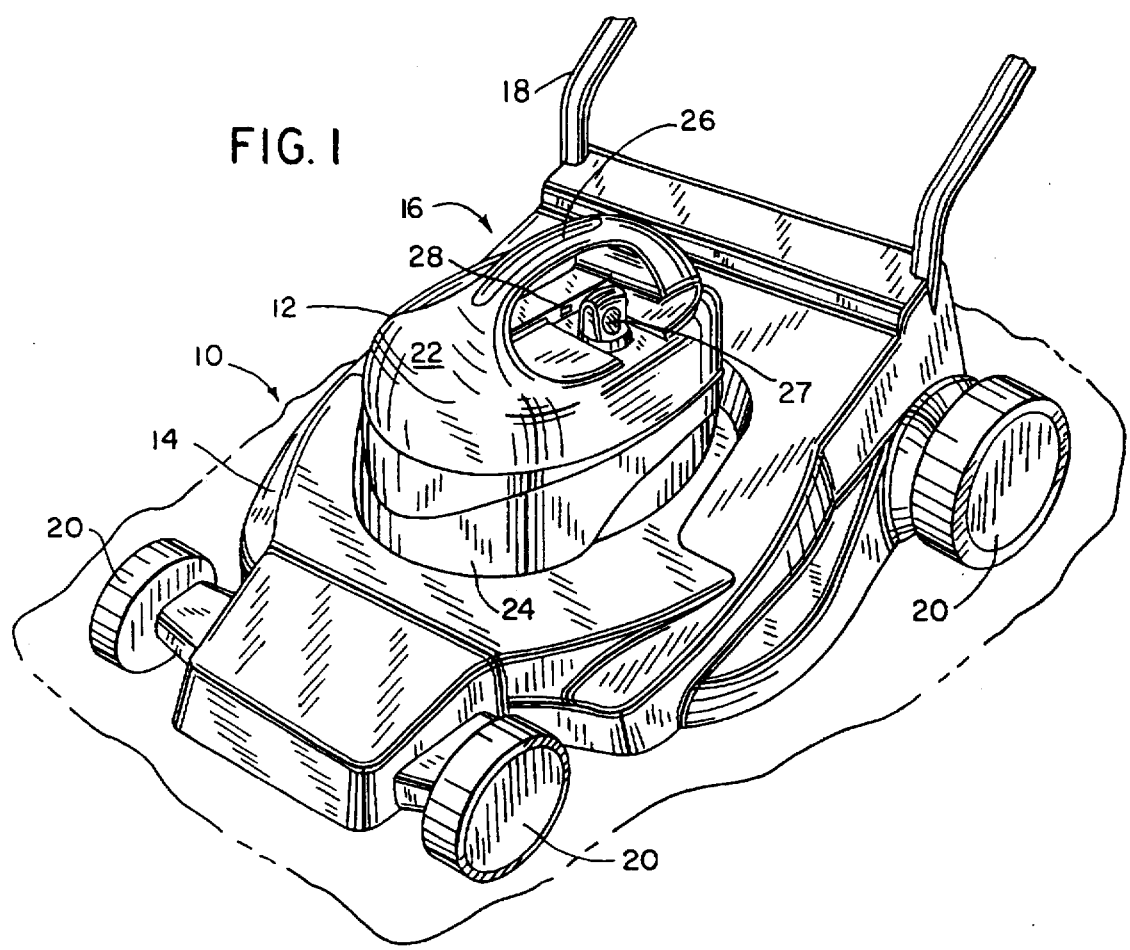
FIG. 1 is a perspective view of a cordless electric lawnmower incorporating the power head assembly according to the present invention.

FIG. 1 is a perspective view of a battery-powered lawnmower 10 that includes a power head assembly 12 according to the present invention. In FIG. 1, lawnmower 10 includes a lawnmower deck 14 having a raised scroll portion 16 that is used for a rear bagging operation. Lawnmower 10 also includes a handle 18 and a plurality of rotatable wheels 20.

Figure 3:
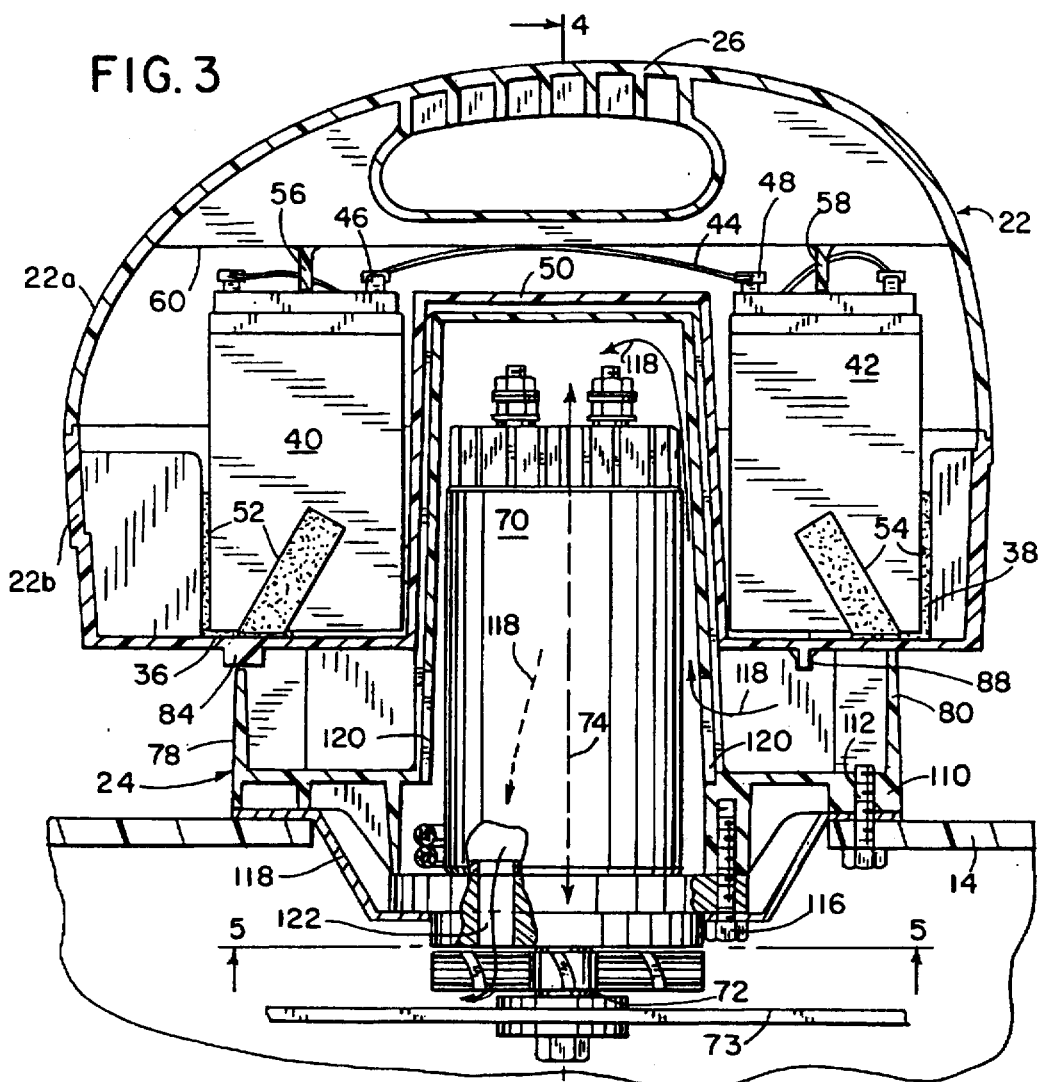
FIG. 3 is a side cross sectional view of the power head assembly, taken along line 3—3 of FIG. 2.
Figure 14:
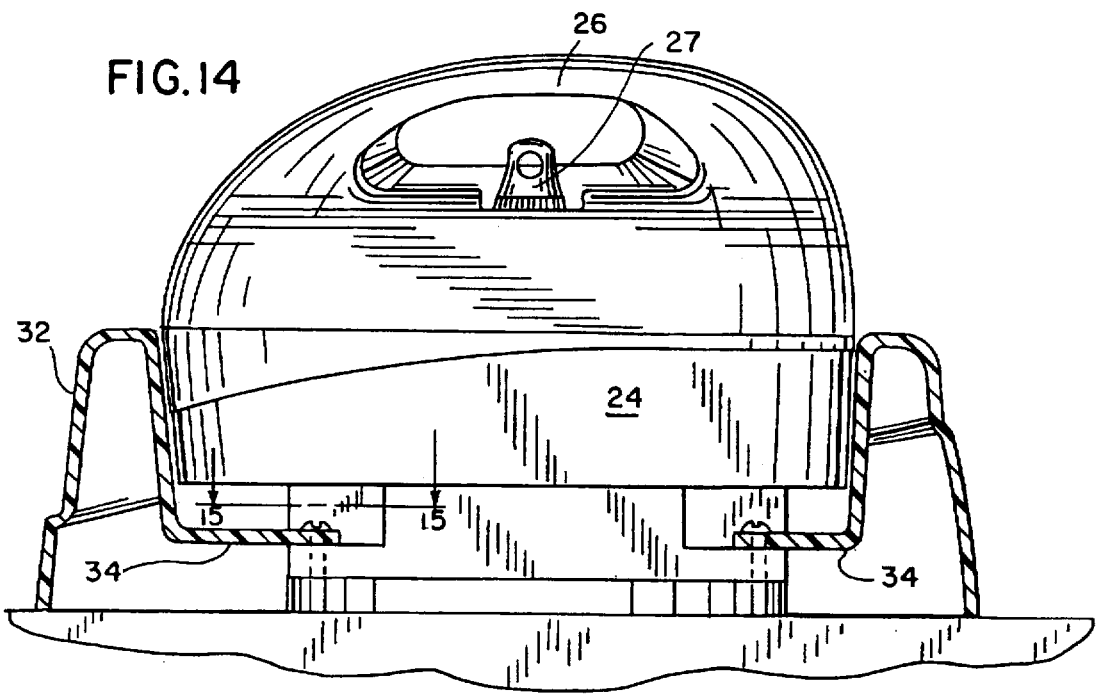
FIG. 14 is a side view of the power head assembly of FIG. 13, with the shroud shown in cross section.

Power head assembly 12 includes an upper housing 22 and a lower housing 24 (FIGS. 3 and 14). A handle 26 is formed integral with upper housing 22 and is used to raise and lower upper housing 22 as more fully discussed below. A removable key 27 is positioned so that it extends from upper housing 22. Key 27 blocks connector 28 so that the batteries in the power head assembly cannot be charged while the lawnmower is operational. Key 27 is positioned such that the key is removed whenever upper housing 22 is removed from lower housing 24.

Figure 13:
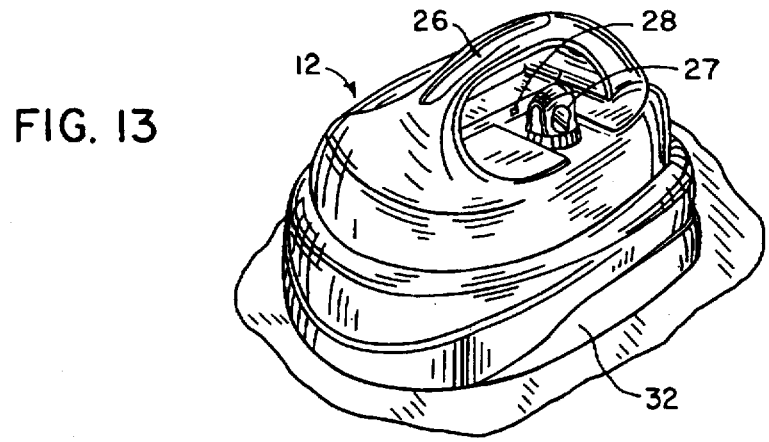
FIG. 13 is a perspective view of the power head assembly having an optional shroud.
Figure 15:
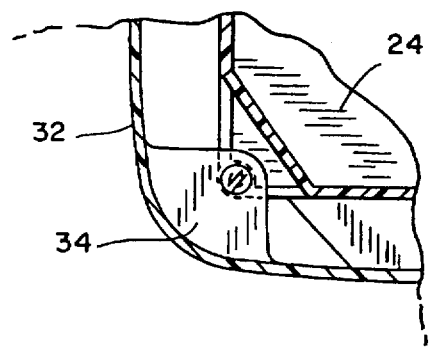
FIG. 15 depicts the shroud mounted to the lower housing taken along line 15—15 of FIG. 14.

Power head assembly 12 may include an optional, removable shroud 32, as best shown in FIGS. 13 through 15. Shroud 32 is primarily used for aesthetic purposes. As best shown in FIG. 14, shroud 32 surrounds at least a portion of the power head assembly and has a plurality of flanges 34 that are used to mount shroud 32 to lower housing 24. FIG. 15 depicts the manner in which flanges 34 are mounted to lower housing 24.

Figure 4:
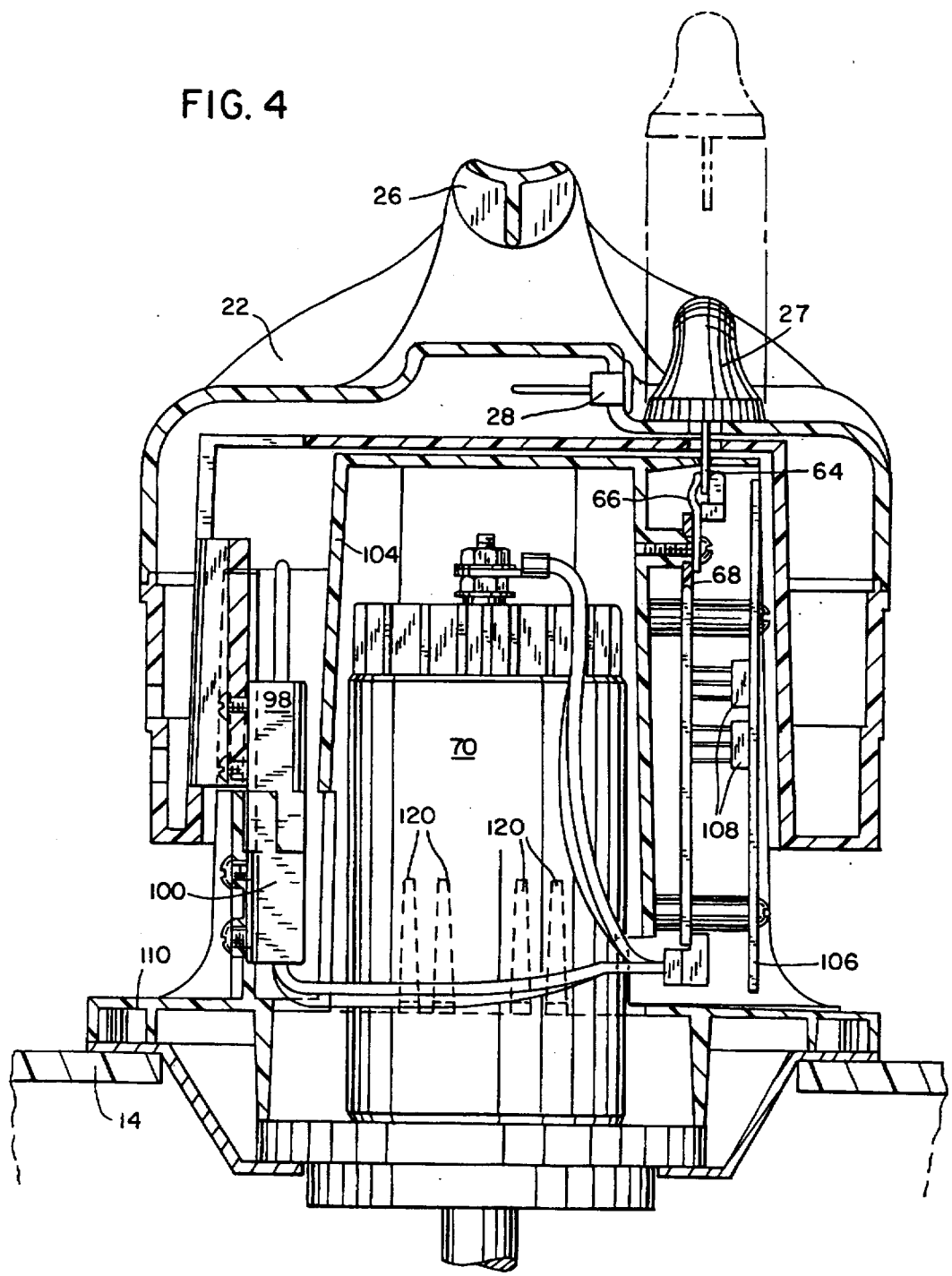
FIG. 4 is a side cross sectional view of the power head assembly, taken along line 4—4 of FIG. 3.

An important feature of the power head assembly according to the present invention is that upper housing 22 is detachable from lower housing 24. This feature is best described in connection with FIGS. 3 and 4. In FIGS. 3 and 4, upper housing 22 includes a first battery receptacle 36 and a second battery receptacle 38. First battery receptacle 36 includes a first 12 volt battery 40, and second battery receptacle 38 includes a second 12 volt battery 42. Batteries 40 and 42 are connected in series via a cable 44 which extends between terminal 46 on first battery 40 and terminal 48 on second battery 42. Battery receptacles 36 and 38 are connected to each other by a bridge section 50. Battery 40 has a foam strip 52 that provide cushioning between battery 40 and receptacle 36. Battery 42 has a similar strip 54.

Batteries 40 and 42 are also kept in place by respective ribs 56 and 58 which extend downwardly from a surface 60.

As best shown in FIG. 3, upper housing 22 is composed of two parts, an upper part 22a and a lower part 22b, to aid in assembly.

As best shown in FIG. 4, upper housing 22 includes an electrical charger connector 28 that is designed to receive a mating connector from a charger. As also best shown in FIG. 4, connector 28 is blocked by a removable key 27 when the key is in place. Key 27 has one or more prongs 64 that pass through aperture 29 in battery 42 and which are then received in a connector 66 which in turn is in circuit connection with a control panel 68, as depicted in FIG. 4. Control panel 68 and connector 66 are affixed to lower housing 24. The electric lawnmower is not operational when key 27 has been removed. Key 27 is automatically removed when upper housing 22 is lifted away from lower housing 24.

Figure 2:
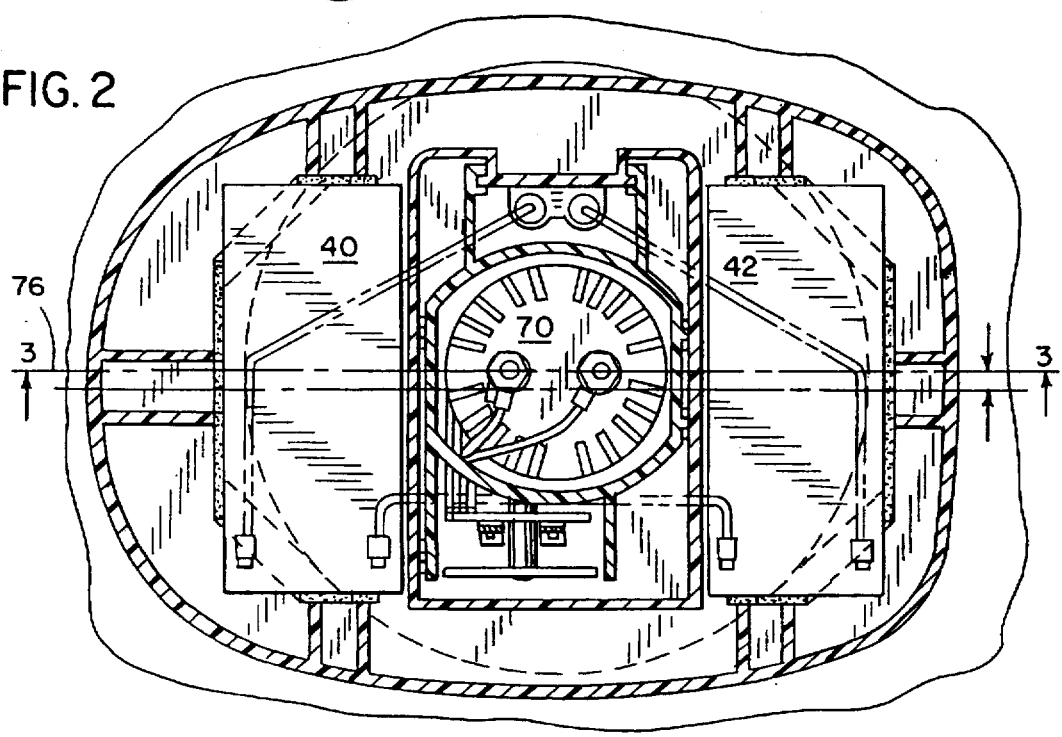
FIG. 2 is a top cross sectional view of the power head assembly according to the present invention.

The positions of batteries 40 and 42 are best shown in connection with FIGS. 2 and 3. As shown in FIGS. 2 and 3, batteries 40 and 42 are disposed on opposite sides of an electric motor 70. Motor 70 has a rotatable shaft 72 (FIG. 3), the shaft having a centerline 74 (FIG. 3). A cutting blade 73 is affixed to shaft 72. To provide additional room for scroll 16 (FIG. 1), the centerlines of batteries 40 and 42 passing through motor 70, represented by line 76 (FIG. 2), are collinear with each other but do not intersect motor shaft centerline 74.

Lower housing 24 is best understood in connection with FIGS. 3, 4, 6 and 7. In these figures, lower housing 24 includes support sections 78 and 80 which support battery receptacles 36 and 38 respectively. The main purpose of support sections 78 and 80 is to raise their respective battery receptacles 36 and 38 and batteries 40 and 42 to avoid interference with scroll 16 or with other structural items on the deck.

Figure 6:
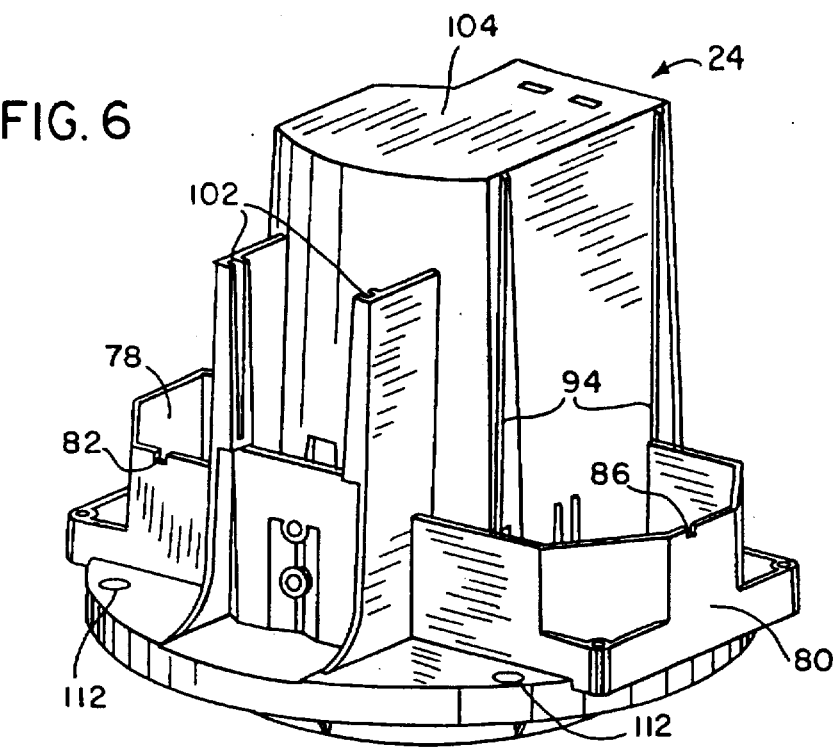
FIG. 6 is a first perspective view of the lower housing according to the present invention.
Figure 7:
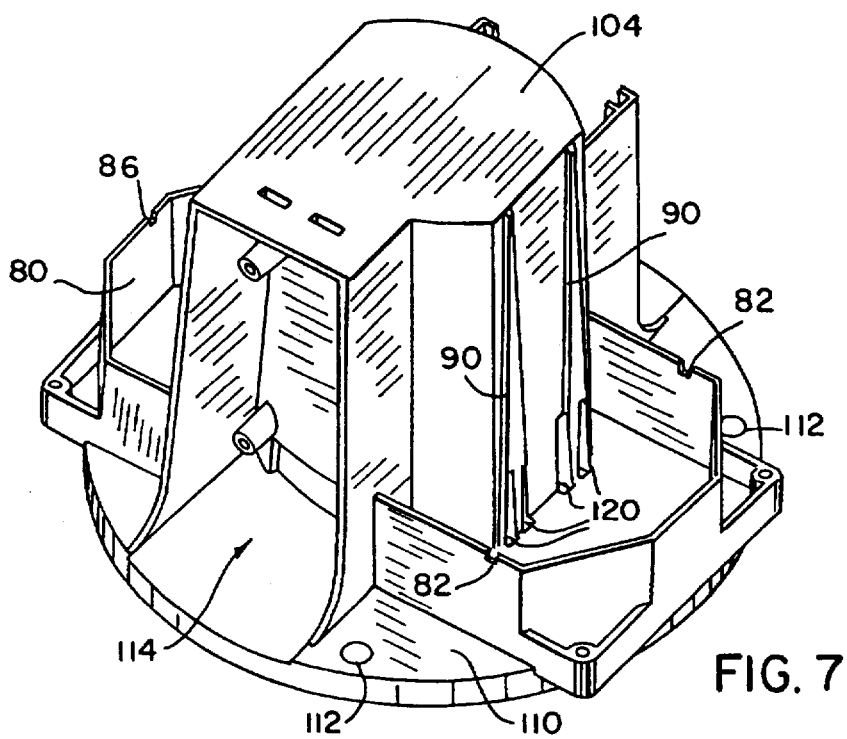
FIG. 7 is a perspective view of the lower housing, depicted from the opposite side thereof.

As best shown in FIGS. 6 and 7, support section 78 has a notch 82 that receives a tab 84 (FIG. 3) which extends from the bottom surface of battery receptacle 36. Also, support section 80 has two opposed notches 86 that receive tabs 88 (FIG. 3) extending from the bottom surface of second battery receptacle 38. The purpose of tabs 84 and 88 and notches 82 and 86 is to precisely position upper housing 22 with respect to lower housing 24.

Figure 8:
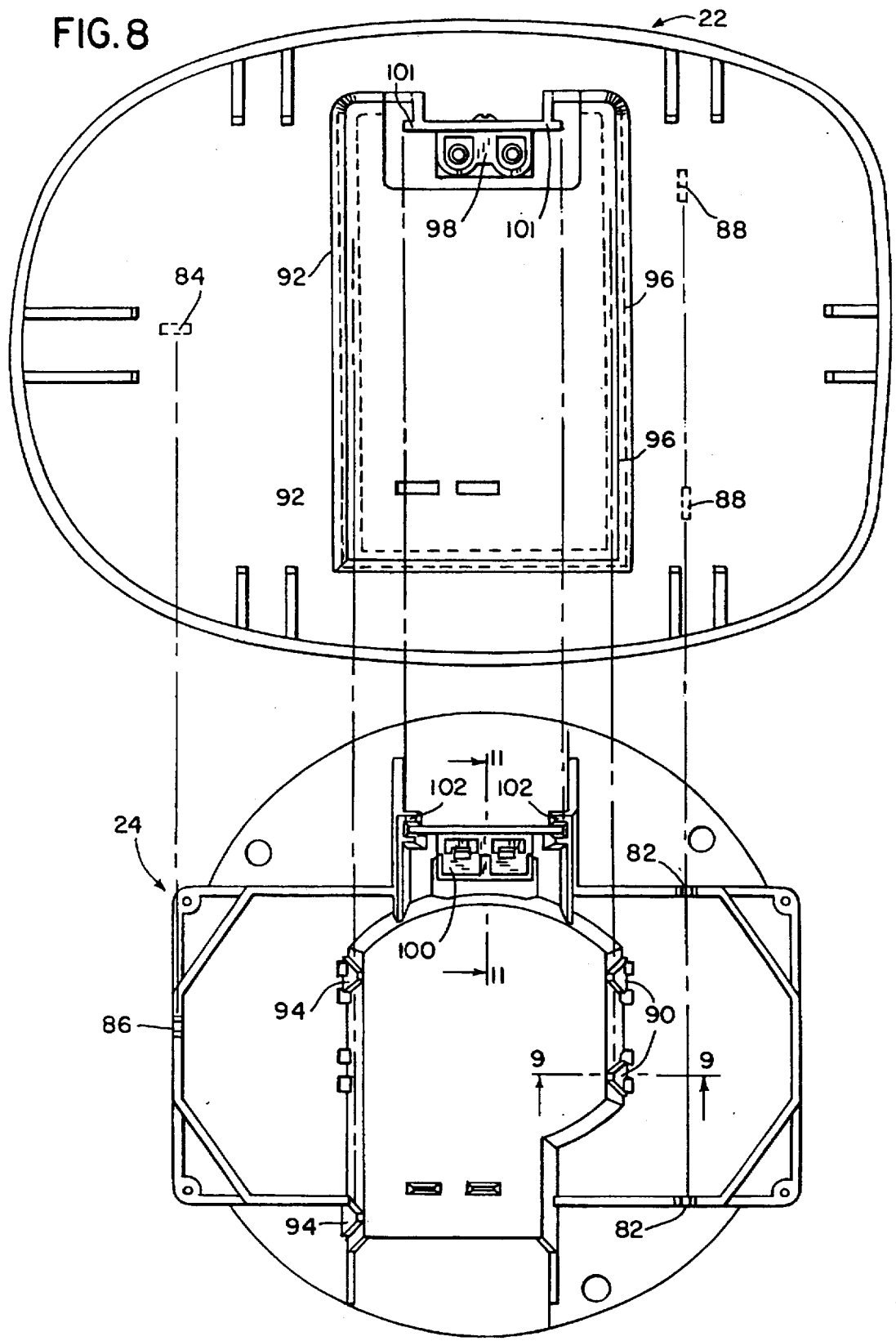
FIG. 8 is an exploded top view depicting the upper housing aligned with the lower housing.

As best shown in FIGS. 6, 7 and 8, lower housing 24 also includes a pair of spaced ribs 90 that engage surfaces 96 and that locate upper housing 22 as the upper housing is being placed on lower housing 24. Lower housing 24 also includes a pair of spaced ribs 94 that engage surfaces 92 and that locate upper housing 22. Rib-surface arrangements 90,96 and 94,92 are used to align upper housing 22 with respect to lower housing 24 when the upper housing is being raised or lowered from the lower housing. This rib-surface arrangement is shown in more detail in FIGS. 9 and 10, which depict rib 94 engaging surface 96. As best shown in FIG. 10, the connection between rib 94 and surface 96 is relatively loose when upper housing 22 is only part of the way disposed onto lower housing 24; however, the connection becomes much tighter when upper housing 22 is disposed all the way down on lower housing 24 due to the matching draft angles on the ribs and the corresponding surfaces.

Another important feature of the present invention is that upper housing 22 includes a quick disconnect electrical connector 98, which forms an electrical connection with the quick disconnect electrical connector 100 that is affixed to lower housing 24. Electrical connectors 98 and 100 are best shown in FIGS. 4, 8, 11 and 12. As best shown in FIG. 8, electrical connector 98 is attached to a wall that has two tongue members 101 disposed on opposite sides thereof, which are received in corresponding grooves 102 of lower housing 24. Grooves 102 are also shown in FIG. 11. Tongues 101 and grooves 102 are also used to precisely align and retain connectors 98 and 100. Connectors 98 and 100 are preferably connectors manufactured by Anderson Power Products.

Electrical connector 98 is in circuit connection with batteries 40 and 42. As best shown in FIG. 4, electrical connector 100 is in circuit connection with motor 70 and control panel 68. FIGS. 11 and 12 more clearly depict electrical connector 98 being connected to electrical connector 100.

Lower housing 24 includes additional features, which are best understood in connection with FIG. 4, and FIGS. 6 through 8. With reference to these figures, it is seen that lower housing 24 includes a motor receptacle 104 that receives at least a portion of motor 70.

Lower housing 24 also includes a heat sink 106, which may be a metal plate, that conducts thermal energy away from a pair of power MOSFET switches 108. One of switches 108 is used to control the power to the motor, along with control panel 68. The other MOSFET switch is used to stop the rotating blade. Control panel 68, as well as key 27 and electrical connectors 98 and 100, are described in more detail in pending patent application Ser. No. 08/388,588 filed Feb. 14, 1995, which is commonly assigned and incorporated by reference herein.

Another feature of lower housing 24 is that it is designed such that motor 70 is partially disposed below lawnmower deck 14, as best shown in FIGS. 3 and 4. In FIGS. 3 and 4, lower housing 24 has a mounting flange 110 that is mounted to deck 14, as best shown in FIG. 3. Mounting flange 110 has a plurality of apertures 112 (FIGS. 6 and 7) that are used to mount lower housing 24 to deck 14. As best shown in FIG. 7, lower housing 24 also includes a cavity 114 that receives control panel 68 (FIG. 4). To prevent interference between the slide that is used to form cavity 114 during the molding process and the tool used to form apertures 112, apertures 112 are disposed adjacent to, and not beneath, cavity 114. This location also provides access for installing a thread insert to apertures 112.

Apertures 112 are also disposed in a standard pattern about motor centerline 74 (FIG. 3) to enable the power head assembly according to the present invention to be used on decks that are originally designed for gasoline-powered lawnmowers. In this way, the original equipment manufacturer does not need to provide a different lawnmower deck for both gasoline-powered and the battery-powered lawnmowers.

Figure 5:
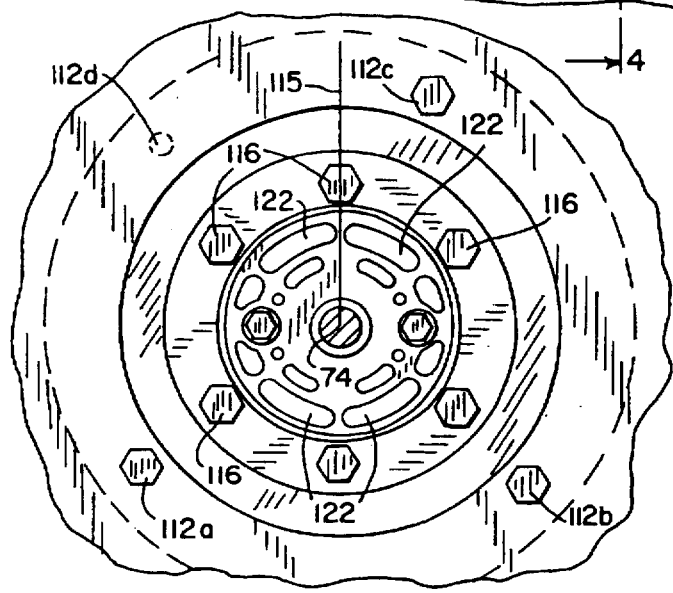
FIG. 5 is a bottom view of the power head-deck assembly according to the present invention.

The mounting apertures and bolts according to the present invention are disposed in accordance with SAE Standard J609a, FIG. 3, page 24.21, which is incorporated by reference herein. In accordance with this SAE Standard, apertures 112 are disposed about 4inches from motor centerline 74, and in the pattern depicted in FIG. 5. In FIG. 5, the zero position is noted by line 115. A first mounting aperture 112a and corresponding bolt are positioned at approximately 127 degrees in a counterclockwise direction from zero position 115 when viewed from the end of the motor shaft. A second aperture 112b and corresponding bolt are positioned approximately 229 degrees in a counterclockwise direction with respect to zero position 115 when viewed from the end of the motor shaft. A third aperture 112c and corresponding bolt are positioned approximately 337 degrees in a counterclockwise direction with respect to zero position 115 when viewed from the end of the motor shaft. An optional fourth aperture 112d may be positioned at about 45 degrees in a counterclockwise direction from zero position 115 when viewed from the end of the motor shaft.

As best shown in FIGS. 3 and 5, motor 70 is attached to lower housing 24 via a plurality of bolts 116. To prevent motor 70 from falling to the ground in the event that bolts 116 become loosened, an additional metal support plate 118 is provided that is connected to lower housing 24 by both bolts 116 and bolts 112, as shown in FIG. 3. Support plate 118 may optionally be provided with standoffs 119 (FIGS. 16 and 17) to tilt the power head assembly. As a result, motor 70, shaft 72 and cutting blade 73 are tilted. This feature causes cutting blade 73 to only cut grass at the forward end of the grass cutting device. Of course, other means could be used to tilt the power head assembly, including using larger rear wheels on the device or designing lower housing 24 so that its rear end has a greater height than its forward end. The use of the metal plate to achieve tilting is preferred because a metal plate without standoffs may readily be substituted in the event tilting is not desired.

Figure 16:
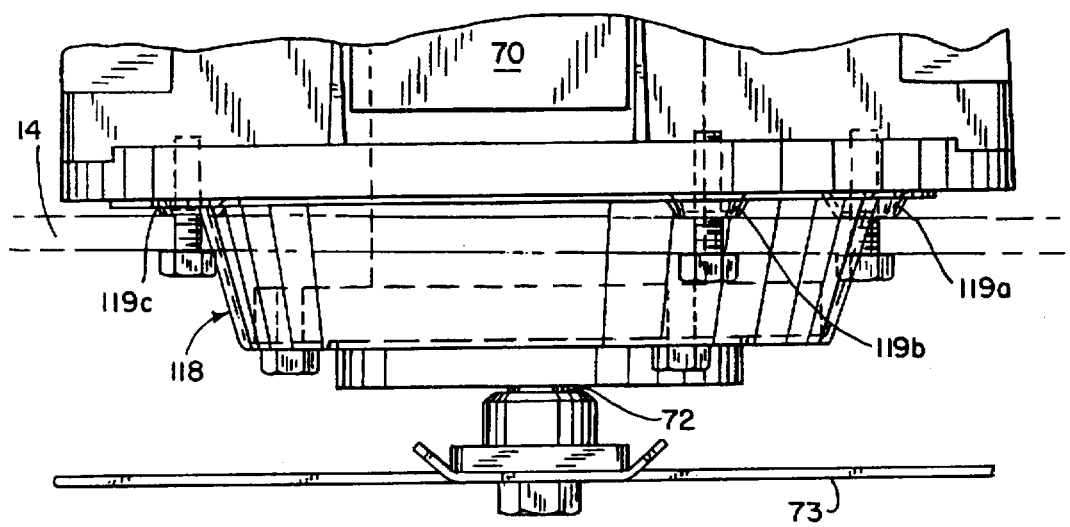
FIG. 16 is a side view depicting an optional support plate that tilts the cutting blade.
Figure 17:
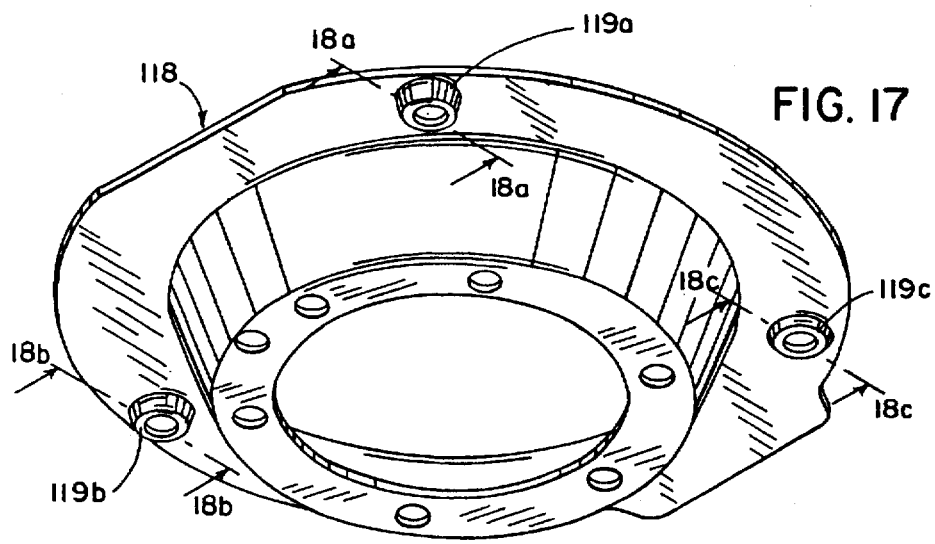
FIG. 17 is a perspective view of the support plate depicted in FIG. 16.
Figures 18A, 18B, 18C:
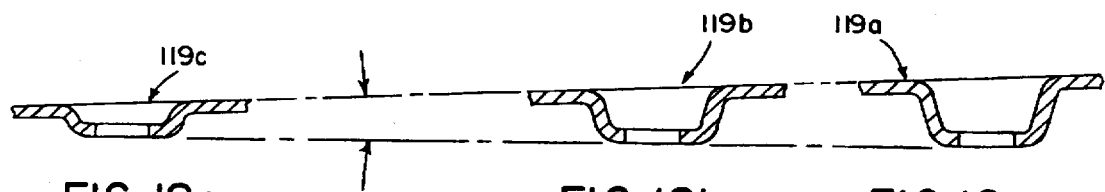
FIG. 18a is a cross sectional view of a first standoff, taken along line 18a—18a of FIG. 17.
FIG. 18b is a cross sectional view of a second standoff, taken along line 18b—18b of FIG. 17.
FIG. 18c is a cross sectional view of a third standoff, taken along line 18c—18c of FIG. 17.

Support plate 118 is shown in FIGS. 16 and 17. In FIGS. 16 and 17, support plate 118 has three standoffs 119a, 119b, and 119c. To assure a proper tilt angle and for stability, each of the standoffs has a different height, as shown in FIGS. 18a, 18b, and 18c. Each of the standoffs has an aperture therein for receiving a mounting bolt.

Cooling air is provided to motor 70 through several slots 120 disposed in lower housing 24, as best shown in FIGS. 3,4, 6 and 7. The air flow, represented by arrows 118 in FIG. 3, enters through slots 120, and exits through slots 122 in the motor (FIGS. 3 and 5).

Another important feature of the present invention is best shown in connection with FIG. 3. As shown in FIG. 3, batteries 40 and 42 are disposed on opposite sides of motor 70, while at the same time a portion of motor 70 is disposed below lawnmower deck 14. The overall result of this configuration is that the power head has a relatively low, balanced profile, which makes it particularly suitable for use with rear bagging lawnmowers since the batteries do not interfere with the rear bagging raised scroll.

Another key feature of the present invention is that the upper housing may be connected and disconnected from the lower housing without the use of tools. Upper housing 22, including battery receptacles 36 and 38, is removable when batteries 40 and 42 are discharged, and may be replaced by another upper housing that includes fully charged batteries. The first upper housing may then be connected to a battery charger, while the lawnmower is continued to be operated with only minimal downtime.

In the alternative, the lawnmower may be operated until the two batteries are substantially discharged, at which time key 27 (FIG. 4) is removed and a charger may be plugged into electrical charger connector 28 (FIG. 4). Thus, the batteries may be recharged without removing them from the lawnmower.

While a preferred embodiment of the present invention has been shown and described, alternate embodiments will be apparent to those skilled in the art and within the intended scope of the present invention. Therefore, the invention is to be limited only by the following claims.

What is claimed is:

1. A housing for a power head assembly used in an electric grass cutting device, comprising:

a motor receptacle that receives an electric motor, said motor having a motor casing;

a quick disconnect electrical terminal in circuit connection with said motor;

a control circuit, in circuit connection with said motor, that controls the power supplied to said motor; and means for mounting said housing to a deck of said grass cutting device such that a portion of said motor casing is disposed below said deck.

2. The housing of claim 1, further comprising:

a cavity, in said housing, that receives said control circuit.

3. The housing of claim 2, wherein said mounting means includes:

a plurality of apertures in said housing that are used to mount said housing to a deck of said grass cutting device, wherein none of said apertures is disposed beneath said cavity.

4. The housing of claim 1, wherein said motor includes a rotatable shaft having a centerline, and wherein said mounting means includes first, second and third apertures disposed such that each of said apertures is about 4 inches from said shaft centerline, and said apertures being disposed counter-clockwise about said shaa centerline such that said first aperture is at about a 127 degree position with respect to a zero position when viewed from an end of said shaft, said second aperture is at about a 229 degree position with respect to said zero position when viewed from said shaft end, and said third aperture is at about a 337 degree position with respect to said zero position when viewed from said shaft end.

5. The housing of claim 1, wherein said mounting means includes a flange that engages a deck of said grass cutting device.

6. The housing of claim 1, further comprising:

a first support that supports a first battery, wherein said first support and said first battery together have a first height that is less than or equal to a height of said motor; and a second support that supports a second battery, wherein said second support and said second battery together have a second height that is less than or equal to said height of said motor.

7. The housing of claim 1, further comprising:

a shroud disposed around at least a portion of said housing.

8. The housing of claim 7, wherein said shroud is removable.

9. A power head assembly for a cordless electric grass cutting device, said device having a deck, comprising:

a housing;

a receptacle in said housing that receives an electric motor;

means for mounting said housing to said deck;

means for lilting said motor with respect to said deck including at least one of:

a plate, disposed between said housing and said deck, that has at least one standoff near one end of said plate, and a raised portion on one end of said housing that raises said housing end with respect to an opposite end of said housing.

* * * * *

UNITED STATES PATENT AND TRADEMARK OFFICE
CERTIFICATE OF CORRECTION

PATENT NO. : 5,894,715
DATED      : April 20, 1999
INVENTOR(S): Michael Braun, et al.

It is certified that error appears in the above-identified patent and that said Letters Patent is hereby corrected as shown below:

Claim 4, Column 7, line 6, "shaa" should be --shaft--.

Claim 9, Column 8, line 7, "lilting" should be --tilting--.

Signed and Sealed this

Ninth Day of November, 1999

Attest:

Q. TODD DICKINSON

*Attesting Officer*     *Acting Commissioner of Patents and Trademarks*